United States Patent
Suciu et al.

(10) Patent No.: US 10,830,148 B2
(45) Date of Patent: Nov. 10, 2020

(54) INTERCOOLED COOLING AIR WITH DUAL PASS HEAT EXCHANGER

(71) Applicant: United Technologies Corporation, Farmington, CT (US)

(72) Inventors: Gabriel L. Suciu, Glastonbury, CT (US); Jesse M. Chandler, South Windsor, CT (US); Joseph Brent Staubach, Colchester, CT (US); Brian D. Merry, Andover, CT (US); Wesley K. Lord, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 297 days.

(21) Appl. No.: 15/978,455

(22) Filed: May 14, 2018

(65) Prior Publication Data

US 2018/0258859 A1 Sep. 13, 2018

Related U.S. Application Data

(60) Continuation-in-part of application No. 15/807,911, filed on Nov. 9, 2017, now Pat. No. 10,718,268.
(Continued)

(51) Int. Cl.
*F01D 5/08* (2006.01)
*F02C 7/18* (2006.01)
(Continued)

(52) U.S. Cl.
CPC .............. *F02C 7/185* (2013.01); *F01D 25/12* (2013.01); *F02C 3/13* (2013.01); *F02C 6/08* (2013.01);
(Continued)

(58) Field of Classification Search
CPC .......... F01D 25/12; F02C 7/185; F02C 7/143; F05D 2260/211; F05D 2260/213; F05D 2260/606
See application file for complete search history.

(56) References Cited

U.S. PATENT DOCUMENTS

| 2,692,476 A | 10/1954 | Schaal et al. |
| 2,940,257 A | 6/1960 | Eckert et al. |
| (Continued) | | |

FOREIGN PATENT DOCUMENTS

| DE | 2852057 | 6/1979 |
| EP | 0447886 | 9/1991 |
| (Continued) | | |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
(Continued)

*Primary Examiner* — Ninh H. Nguyen
(74) *Attorney, Agent, or Firm* — Carlson, Gaskey & Olds, P.C.

(57) ABSTRACT

A gas turbine engine includes a main compressor. A tap is fluidly connected downstream of the main compressor. A heat exchanger is fluidly connected downstream of the tap. An auxiliary compressor unit is fluidly connected downstream of the heat exchanger. The auxiliary compressor unit is configured to compress air cooled by the heat exchanger with an overall auxiliary compressor unit pressure ratio between 1.1 and 6.0. An intercooling system for a gas turbine engine is also disclosed.

7 Claims, 4 Drawing Sheets

Related U.S. Application Data which is a division of application No. 14/695,504, filed on Apr. 24, 2015, now Pat. No. 9,850,819.

(51) Int. Cl.

| | | |
|---|---|---|
| *F01D 25/12* | (2006.01) | |
| *F02C 3/13* | (2006.01) | |
| *F02C 7/143* | (2006.01) | |
| *F02C 7/32* | (2006.01) | |
| *F02C 6/08* | (2006.01) | |
| *F02K 3/115* | (2006.01) | |

(52) U.S. Cl.
CPC ............... *F02C 7/143* (2013.01); *F02C 7/32* (2013.01); *F02K 3/115* (2013.01); *F05D 2210/44* (2013.01); *F05D 2220/3212* (2013.01); *F05D 2220/3218* (2013.01); *F05D 2260/211* (2013.01); *F05D 2260/213* (2013.01); *F05D 2260/606* (2013.01); *Y02T 50/60* (2013.01)

(56) References Cited

U.S. PATENT DOCUMENTS

| | | | |
|---|---|---|---|
| 3,473,603 A | | 10/1969 | Fujie |
| 3,878,677 A | | 4/1975 | Colvin |
| 4,233,815 A | * | 11/1980 | Melchior ............ F02B 37/013 60/606 |
| 4,254,618 A | | 3/1981 | Elovic |
| 4,351,150 A | | 9/1982 | Schulze |
| 4,428,715 A | * | 1/1984 | Wiggins ............ F04D 17/127 415/199.2 |
| 4,539,945 A | | 9/1985 | Bosisio |
| 4,751,814 A | | 6/1988 | Farrell |
| 4,882,902 A | | 11/1989 | Reigel et al. |
| 5,056,335 A | | 10/1991 | Renninger et al. |
| 5,163,285 A | | 11/1992 | Mazeaud et al. |
| 5,269,135 A | | 12/1993 | Vermejan et al. |
| 5,305,616 A | | 4/1994 | Coffinberry |
| 5,392,614 A | | 2/1995 | Coffinberry |
| 5,414,992 A | | 5/1995 | Glickstein |
| 5,452,573 A | | 9/1995 | Glickstein et al. |
| 5,498,126 A | | 3/1996 | Pighetti et al. |
| 5,697,208 A | | 12/1997 | Glezer et al. |
| 5,724,806 A | | 3/1998 | Horner |
| 5,758,485 A | | 6/1998 | Frutschi |
| 5,860,279 A | | 1/1999 | Bronicki et al. |
| 5,867,979 A | | 2/1999 | Newton et al. |
| 5,918,458 A | | 7/1999 | Coffinberry et al. |
| 6,050,079 A | | 4/2000 | Durgin et al. |
| 6,065,282 A | | 5/2000 | Fukue et al. |
| 6,134,880 A | | 10/2000 | Yoshinaka |
| 6,430,931 B1 | | 8/2002 | Horner |
| 6,487,863 B1 | | 12/2002 | Chen et al. |
| 6,612,114 B1 | | 9/2003 | Klingels |
| 6,615,603 B2 | | 9/2003 | Tanaka et al. |
| 6,892,523 B2 | | 5/2005 | Fetescu et al. |
| 7,237,386 B2 | | 7/2007 | Hoffmann et al. |
| 7,246,484 B2 | | 7/2007 | Giffin, III et al. |
| 7,284,377 B2 | | 10/2007 | Joshi et al. |
| 7,306,424 B2 | | 12/2007 | Romanov et al. |
| 7,334,412 B2 | | 2/2008 | Tiemann |
| 7,347,637 B2 | | 3/2008 | Kubo et al. |
| 7,500,365 B2 | | 3/2009 | Suciu et al. |
| 7,552,591 B2 | | 6/2009 | Bart et al. |
| 7,698,884 B2 | | 4/2010 | Maguire et al. |
| 7,765,788 B2 | | 8/2010 | Schwarz |
| 7,823,389 B2 | | 11/2010 | Seltzer et al. |
| 7,882,691 B2 | | 2/2011 | Lemmers, Jr. et al. |
| 7,886,520 B2 | | 2/2011 | Stretton et al. |
| 8,015,828 B2 | | 9/2011 | Moniz et al. |
| 8,037,686 B2 | | 10/2011 | Lasker |
| 8,087,249 B2 | | 1/2012 | Ottaviano et al. |
| 8,181,443 B2 | | 5/2012 | Rago |
| 8,231,341 B2 | * | 7/2012 | Anderson ............ F02C 3/08 415/181 |
| 8,307,662 B2 | | 11/2012 | Turco |
| 8,350,398 B2 | | 1/2013 | Butt |
| 8,397,487 B2 | | 3/2013 | Sennoun et al. |
| 8,402,742 B2 | | 3/2013 | Roberge et al. |
| 8,434,997 B2 | | 5/2013 | Pinero et al. |
| 8,511,605 B2 | | 8/2013 | Suciu et al. |
| 8,511,967 B2 | | 8/2013 | Suciu et al. |
| 8,522,529 B2 | | 9/2013 | Martinou et al. |
| 8,572,982 B2 | | 11/2013 | Tiemann |
| 8,602,717 B2 | | 12/2013 | Suciu et al. |
| 8,621,871 B2 | | 1/2014 | McCune et al. |
| 8,727,703 B2 | | 5/2014 | Laurello et al. |
| 8,776,952 B2 | | 7/2014 | Schwarz et al. |
| 8,814,502 B2 | | 8/2014 | Eleftheriou |
| 8,826,675 B2 | | 9/2014 | Rodriguez et al. |
| 8,876,465 B2 | | 11/2014 | Stretton |
| 8,961,108 B2 | | 2/2015 | Bergman et al. |
| 9,188,009 B2 | | 11/2015 | Yilmaz et al. |
| 9,222,411 B2 | | 12/2015 | Sennoun |
| 9,234,481 B2 | | 1/2016 | Suciu et al. |
| 9,239,005 B2 | | 1/2016 | Strecker et al. |
| 9,243,563 B2 | | 1/2016 | Lo |
| 9,255,492 B2 | | 2/2016 | Bacic |
| 9,297,391 B2 | | 3/2016 | Rued et al. |
| 9,422,063 B2 | | 8/2016 | Diaz |
| 9,429,072 B2 | | 8/2016 | Diaz et al. |
| 2003/0046938 A1 | | 3/2003 | Mortzheim et al. |
| 2004/0088995 A1 | | 5/2004 | Reissig |
| 2005/0172612 A1 | | 8/2005 | Yamanaka et al. |
| 2007/0022735 A1 | | 2/2007 | Henry et al. |
| 2007/0213917 A1 | | 9/2007 | Bruno et al. |
| 2007/0245738 A1 | | 10/2007 | Stretton et al. |
| 2008/0028763 A1 | | 2/2008 | Schwarz et al. |
| 2008/0230651 A1 | | 9/2008 | Porte |
| 2008/0253881 A1 | | 10/2008 | Richards |
| 2009/0007567 A1 | | 1/2009 | Porte et al. |
| 2009/0090096 A1 | | 4/2009 | Sheridan |
| 2009/0145102 A1 | | 6/2009 | Roberge et al. |
| 2009/0196736 A1 | | 8/2009 | Sengar et al. |
| 2009/0226297 A1 | | 9/2009 | Yanagi et al. |
| 2009/0272120 A1 | | 11/2009 | Tiemann |
| 2010/0043396 A1 | | 2/2010 | Coffinberry |
| 2010/0154434 A1 | | 6/2010 | Kubota et al. |
| 2011/0036066 A1 | | 2/2011 | Zhang et al. |
| 2011/0088405 A1 | | 4/2011 | Turco |
| 2011/0120083 A1 | | 5/2011 | Giffin et al. |
| 2011/0135456 A1 | | 6/2011 | Takahashi et al. |
| 2011/0247344 A1 | | 10/2011 | Glahn et al. |
| 2012/0067055 A1 | | 3/2012 | Held |
| 2012/0102915 A1 | | 5/2012 | Baltas |
| 2012/0117977 A1 | | 5/2012 | Childers et al. |
| 2012/0159961 A1 | | 6/2012 | Krautheim et al. |
| 2012/0180509 A1 | | 7/2012 | DeFrancesco |
| 2013/0036747 A1 | | 2/2013 | Fuchs et al. |
| 2013/0067928 A1 | | 3/2013 | Arias Chao et al. |
| 2013/0098059 A1 | | 4/2013 | Suciu et al. |
| 2013/0145744 A1 | | 6/2013 | Lo et al. |
| 2013/0145774 A1 | | 6/2013 | Duong et al. |
| 2013/0186102 A1 | | 7/2013 | Lo |
| 2013/0199156 A1 | | 8/2013 | Ress, Jr. et al. |
| 2013/0239583 A1 | | 9/2013 | Suciu et al. |
| 2013/0319002 A1 | | 12/2013 | Sidelkovskiy et al. |
| 2014/0020506 A1 | | 1/2014 | Duong |
| 2014/0137417 A1 | | 5/2014 | Silberberg et al. |
| 2014/0196469 A1 | | 7/2014 | Finney et al. |
| 2014/0208768 A1 | | 7/2014 | Bacic |
| 2014/0230444 A1 | | 8/2014 | Hao et al. |
| 2014/0250898 A1 | | 9/2014 | Mackin et al. |
| 2014/0260326 A1 | | 9/2014 | Schwarz et al. |
| 2014/0311157 A1 | | 10/2014 | Laurello et al. |
| 2014/0341704 A1 | | 11/2014 | Fletcher |
| 2014/0352315 A1 | | 12/2014 | Diaz |
| 2015/0114611 A1 | | 4/2015 | Morris et al. |
| 2015/0285147 A1 | | 10/2015 | Phillips et al. |
| 2015/0308339 A1 | | 10/2015 | Forcier |
| 2015/0330236 A1 | | 11/2015 | Beecroft et al. |
| 2015/0354465 A1 | | 12/2015 | Suciu et al. |

(56) References Cited

U.S. PATENT DOCUMENTS

| | | |
|---|---|---|
| 2015/0354822 A1 | 12/2015 | Suciu et al. |
| 2016/0010554 A1 | 1/2016 | Suciu et al. |
| 2016/0131036 A1 | 5/2016 | Bintz et al. |
| 2016/0131037 A1 | 5/2016 | Spangler et al. |
| 2016/0169118 A1 | 6/2016 | Duong |
| 2016/0215732 A1 | 7/2016 | Malecki |
| 2016/0237906 A1 | 8/2016 | Suciu et al. |
| 2016/0312797 A1 | 10/2016 | Suciu et al. |
| 2016/0341125 A1 | 11/2016 | Kraft et al. |
| 2016/0369697 A1 | 12/2016 | Schwarz et al. |
| 2017/0009657 A1 | 1/2017 | Schwarz et al. |
| 2017/0044980 A1 | 2/2017 | Duesler et al. |
| 2017/0044982 A1 | 2/2017 | Duesler et al. |
| 2017/0152765 A1 | 6/2017 | Uechi et al. |
| 2017/0159568 A1 | 6/2017 | Sennoun et al. |
| 2017/0167388 A1 | 6/2017 | Merry et al. |
| 2017/0175632 A1 | 6/2017 | Hanrahan et al. |
| 2017/0184027 A1 | 6/2017 | Moniz et al. |
| 2017/0204787 A1 | 7/2017 | Duesler et al. |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| EP | 3219959 | 9/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

U.S. Appl. No. 15/232,101, filed Aug. 9, 2016, Geared Turbofan with Low Spool Power Extraction.
U.S. Appl. No. 14/964,984, filed Dec. 10, 2015, Multi-Source Turbine Cooling Air.
U.S. Appl. No. 14/967,446, filed Dec. 14, 2015, Intercooled Cooling Air with Auxiliary Compressor Control.
U.S. Appl. No. 15/069,197, filed Mar. 14, 2016, Intercooled Cooling Air Using Existing Heat Exchanger.
U.S. Appl. No. 15/269,014, filed Sep. 19, 2016, Gas Turbine Engine with Intercooled Cooling Air and Turbine Drive.
U.S. Appl. No. 15/373,072, filed Dec. 8, 2016, Twin Shafts Driving Adjacent Fans for Aircraft Propulsion.
European Search Report for EP Application No. 17160816.9 dated Jul. 21, 2017.
European Search Report for European Application No. 16180657.5 dated Dec. 16, 2016.
European Search Report for European Application No. 16202876.5 dated Apr. 24, 2017.
European Search Report for European Application No. 16155316.9 dated Jun. 30, 2016.
European Search Report for Application No. 16170021.6 dated Oct. 18, 2016.
European Search Report for Application No. 16174862.9 dated Nov. 14, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 30, 2016.
European Search Report for European Patent Application No. 16166724.1 dated Sep. 26, 2016.
European Search Report for European Application No. 16166707.6 dated Sep. 26, 2016.
European Search Report for European Patent Application No. 16154635.3 dated Jul. 6, 2016.
The Extended European Search Report for EP Application No. 19173793.1, dated Dec. 3, 2019.

* cited by examiner

INTERCOOLED COOLING AIR WITH DUAL PASS HEAT EXCHANGER

CROSS-REFERENCE TO RELATED APPLICATION

This application is a continuation-in-part of U.S. patent application Ser. No. 15/807,911, filed Nov. 9, 2017, which is a divisional of U.S. patent application Ser. No. 14/695,504, filed Apr. 24, 2015.

BACKGROUND

This application relates to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the downstream most end of the compressor has been tapped, passed through a heat exchanger, which may sit in the bypass duct and then delivered into the turbine section. The air from the downstream most end of the compressor section is at elevated temperatures.

SUMMARY

In a featured embodiment, a gas turbine engine includes a main compressor. A tap is fluidly connected downstream of the main compressor. A heat exchanger is fluidly connected downstream of the tap. An auxiliary compressor unit is fluidly connected downstream of the heat exchanger. The auxiliary compressor unit is configured to compress air cooled by the heat exchanger with an overall auxiliary compressor unit pressure ratio between 1.1 and 6.0.

In another embodiment according to the previous embodiment, a pressure ratio across the auxiliary compressor unit is greater than or equal to 4.1 and less than or equal to 6.0.

In another embodiment according to any of the previous embodiments, at least one of the more upstream locations is in a low pressure compressor In another embodiment according to any of the previous embodiments, a pressure ratio across the auxiliary compressor unit being greater than or equal to 1.1 and less than or equal to 4.0.

In another embodiment according to any of the previous embodiments, at least one of said more upstream locations is in a high pressure compressor.

In another embodiment according to any of the previous embodiments, a main fan delivers bypass air into a bypass duct and into the main compressor section and the heat exchanger positioned within the bypass duct to be cooled by bypass air.

In another embodiment according to any of the previous embodiments, at least one of the more upstream locations is in a high pressure compressor.

In another embodiment according to any of the previous embodiments, at least one of the more upstream locations is in a low pressure compressor.

In another embodiment according to any of the previous embodiments, at least one of the more upstream locations is in a downstream half of said low pressure compressor.

In another embodiment according to any of the previous embodiments, the heat exchanger has at least two passes. A first of the passes air in a direction having a radially outward component. A second of the passes returns the air in a direction having a radially inward component. The first pass is located downstream of the second pass, and within a bypass duct.

In another featured embodiment, an intercooling system for a gas turbine engine includes a heat exchanger fluidly connected downstream of a tap taking air from a portion of a main compressor section at a first temperature and pressure for cooling the air to a second temperature cooler than the first temperature. An auxiliary compressor unit is connected downstream of the heat exchanger to a second pressure greater than the first pressure and communicates the cooling air to a portion of a turbine section. An overall pressure ratio is provided between an inlet to the cooling compressor to its outlet being between 1.1 and 6.0.

In another embodiment according to the previous embodiment, a pressure ratio across said auxiliary compressor unit is greater than or equal to 4.1 and less than or equal to 6.0.

In another embodiment according to any of the previous embodiments, at least one of the more upstream locations is in a low pressure compressor.

In another embodiment according to any of the previous embodiments, a pressure ratio across the auxiliary compressor unit being greater than or equal to 1.1 and less than or equal to 4.0.

In another embodiment according to any of the previous embodiments, at least one of the more upstream locations is in a high pressure compressor.

In another embodiment according to any of the previous embodiments, a main fan delivers bypass air into a bypass duct and into the main compressor section and the heat exchanger positioned within the bypass duct to be cooled by bypass air.

In another embodiment according to any of the previous embodiments, the heat exchanger has at least two passes. A first of the passes air in a direction having a radially outward component. A second of the passes returns the air in a direction having a radially inward component. The first pass being located downstream of the second pass, and within a bypass duct.

In another embodiment according to the previous embodiment, at least one of the more upstream locations is in a high pressure compressor.

In another embodiment according to any of the previous embodiments, at least one of the more upstream locations is in a low pressure compressor.

In another featured embodiment, an intercooling system for a gas turbine engine includes a heat exchanger for cooling air drawn from a portion of a main compressor section at a first temperature and pressure for cooling the air to a second temperature cooler than the first temperature. A cooling compressor compresses air communicated from the heat exchanger to a second pressure greater than the first pressure and communicating the cooling air to a portion of a turbine section. The heat exchanger has at least two passes. A first of the passes air in a direction having a radially outward component. A second of the passes returns the air in a direction having a radially inward component. The first pass is located downstream of the second pass, and within a bypass duct.

These and other features may best be understood from the following specification and drawings, the following of which is a brief description.

DETAILED DESCRIPTION

Figure 1:
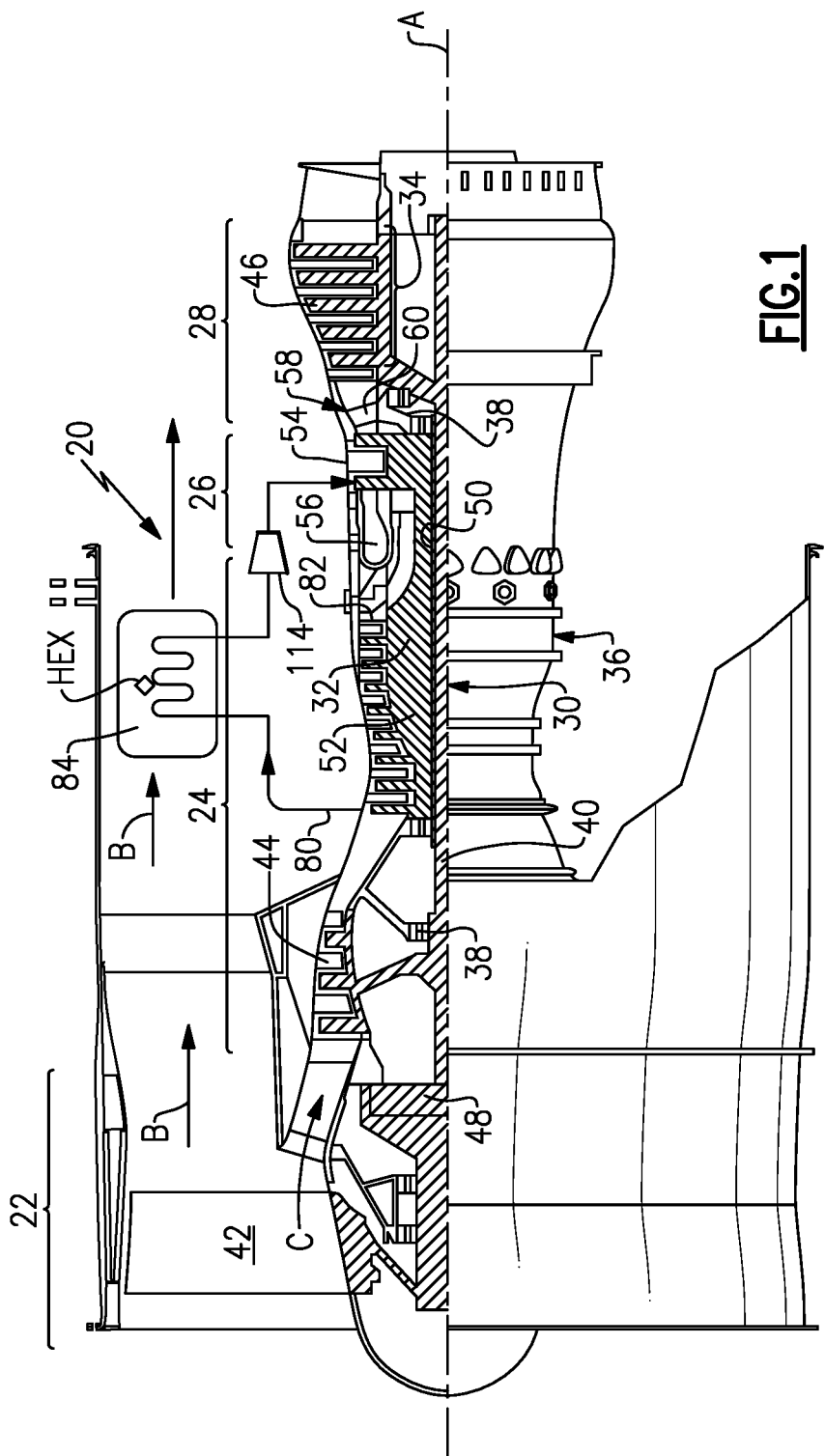
FIG. 1 schematically shows a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram °R)/(518.7 °R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 utilizes air bleed 80 from an upstream portion of the compressor section 24 for use in cooling portions of the turbine section 28. The air bleed is from a location upstream of the downstream end 82 of the compressor section 24. The bleed air passes through a heat exchanger 84 to further cool the cooling air provided to the turbine section 54. The air passing through heat exchanger 84 is cooled by the bypass air B. That is, heat exchanger 84 is positioned in the path of bypass air B. As better described below, a booster compressor 114 helps drive the air.

Figure 2:
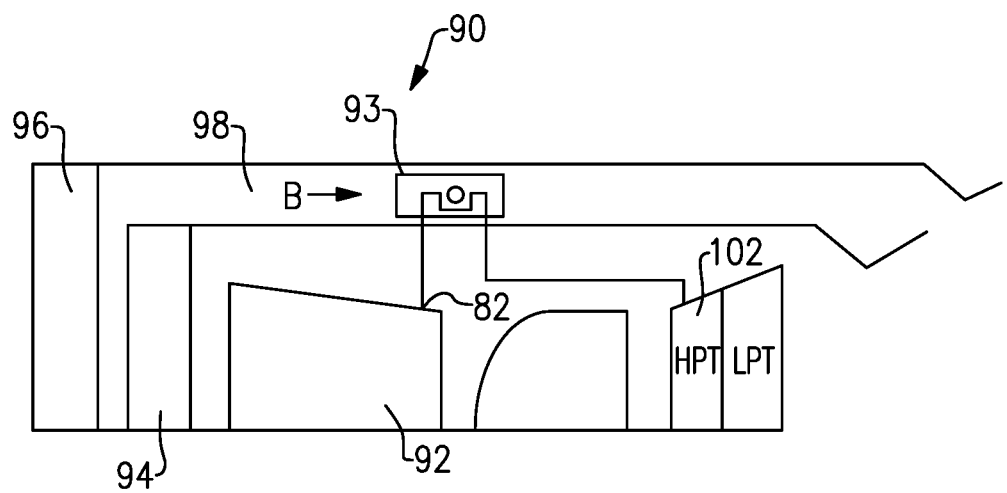
FIG. 2 shows a prior art engine.

A prior art approach to providing cooling air is illustrated in FIG. 2. An engine 90 incorporates a high pressure compressor 92 downstream of the low pressure compressor 94. As known, a fan 96 delivers air into a bypass duct 98 and into the low pressure compressor 94. A downstream most point 82 in the high pressure compressor 92 provides bleed air into a heat exchanger 93. The heat exchanger is in the path of the bypass air in bypass duct 98, and is cooled. This high pressure high temperature air from location 82 is delivered into a high pressure turbine 102.

The downstream most point 82 of the high pressure compressor 82 is known as station 3. The temperature T3 and pressure P3 are both very high.

In future engines, T3 levels are expected to approach greater than or equal to 1350° F. Current heat exchanger technology is becoming a limiting factor as they are made of materials, manufacturing, and design capability which have difficulty receiving such high temperature levels.

Figure 3:
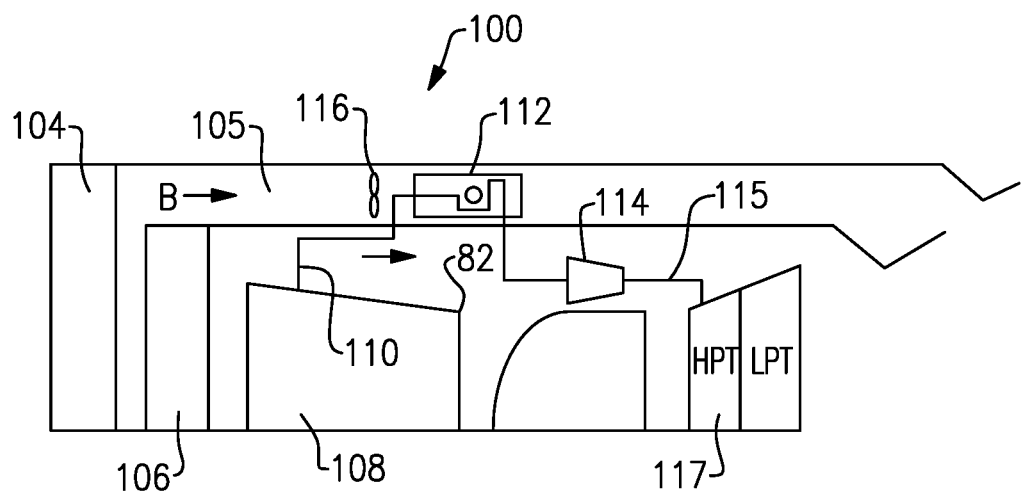
FIG. 3 shows one example engine.

FIG. 3 shows an engine 100 coming within the scope of this disclosure. A fan 104 may deliver air B into a bypass duct 105 and into a low pressure compressor 106. High pressure compressor 108 is positioned downstream of the low pressure compressor 106. A bleed 110 taps air from a location upstream of the downstream most end 82 of the high pressure compressor 108. This air is at temperatures and pressures which are much lower than T3/P3. The air tapped at 110 passes through a heat exchanger 112 which sits in the bypass duct 105 receiving air B. Further, the air from the heat exchanger 112 passes through a compressor 114, and then into a conduit 115 leading to a high turbine 117. This structure is all shown schematically.

Since the air tapped at point 110 is at much lower pressures and temperatures than the FIG. 2 prior art, currently available heat exchanger materials and technology may be utilized. This air is then compressed by compressor 114 to a higher pressure level such that it will be able to flow into the high pressure turbine 117.

An auxiliary fan 116 is illustrated upstream of the heat exchanger 112. The main fan 104 may not provide sufficient pressure to drive sufficient air across the heat exchanger 112. The auxiliary fan 116 will ensure there is adequate air flow in the circumferential location of the heat exchanger 112.

In one embodiment, the auxiliary fan 116 may be variable speed, with the speed of the fan varied to control the temperature of the air downstream of the heat exchanger 112. As an example, the speed of the auxiliary fan 116 may be varied based upon the operating power of the overall engine.

Further details of the basic system may be found in co-pending patent application Ser. No. 14/695,578, entitled "Intercooled Cooling Air," and filed on Apr. 24, 2015, which application is hereby incorporated in its entirety by reference.

Details with regard to an optional arrangement may be found in co-pending patent application Ser. No. 14/695,534, entitled "Intercooled Cooling Air With Plural Tap Locations," and filed on Apr. 24, 2015, which application is hereby incorporated in its entirety by reference.

Figure 4:
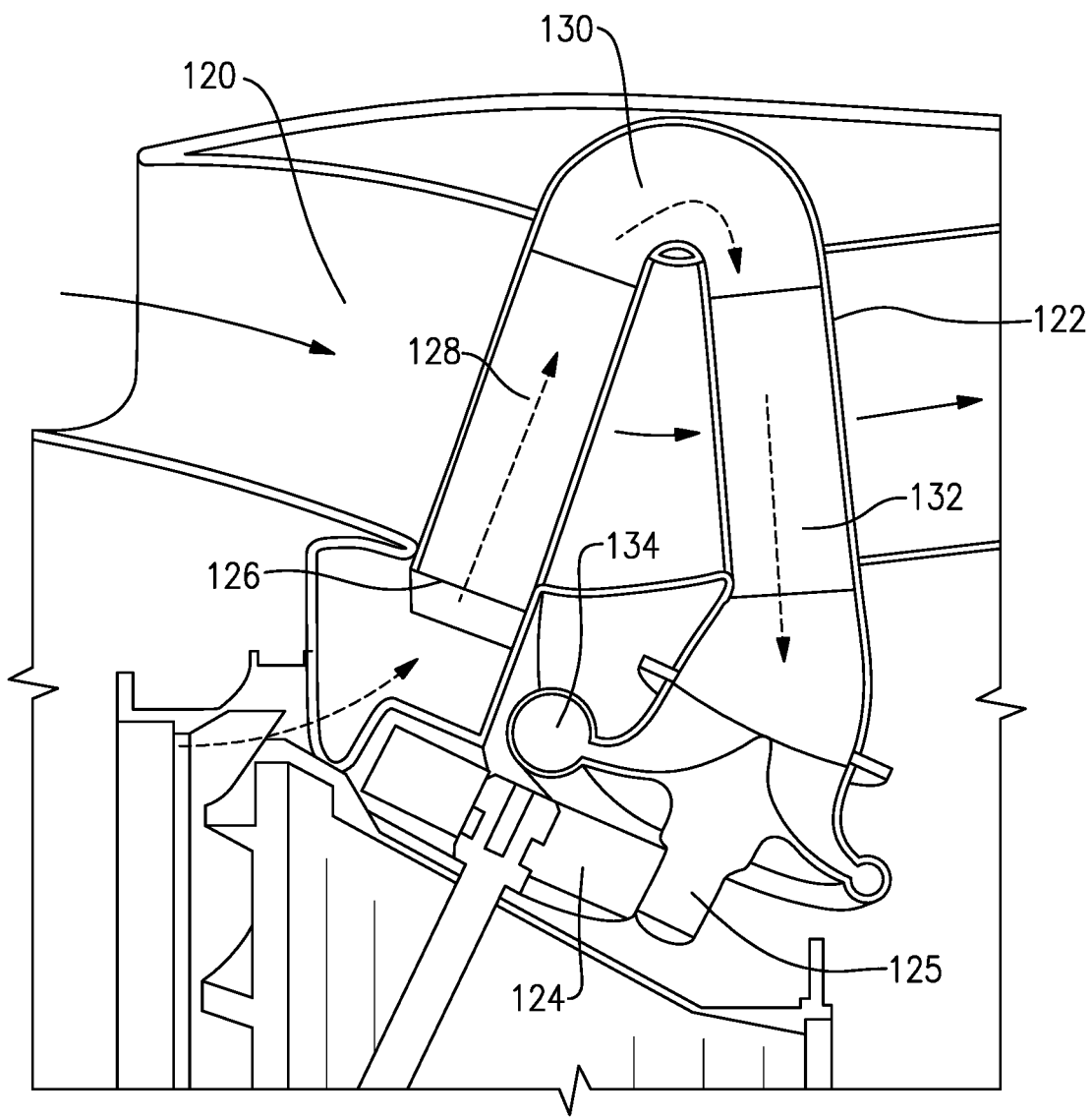
FIG. 4 shows a first embodiment heat exchanger.

FIG. 4 shows a unique heat exchanger structure. A bypass duct 120 receives the heat exchanger 122. A drive 124 drives compressor impeller 125. Impeller 125 is a centrifugal impeller. An inlet 126 receives air, which may be from the low pressure compressor, and delivers that air into a first heat exchanger pass 128 where it is cooled by the bypass air. The low pressure compressor could be said to have an upstream end and a downstream end. The tap inlet 126 is in a downstream half of the low pressure compressor. That is, it is within the middle to the high pressure location in the low pressure compressor. The air then turns through an elbow 130 into a second pass 132 before reaching the impeller 125. From the impeller 125, the air is discharged at outlet 134, and then passes at least to the turbine. In addition, the air may pass to the high compressor's rear areas and connecting hubs requiring cooling. This is also as in the above embodiments.

The heat exchanger 122 is a schematic representation of one continuous passage of a cooling arrangement. In practice the outer surfaces of 128 and 132 could have extended surfaces to facilitate the flow of heat from the very dense air at 128 to the low density air at 120 whereby the extended surface would compensate for the thermal resistance presented by the low density fluid.

Figure 5:
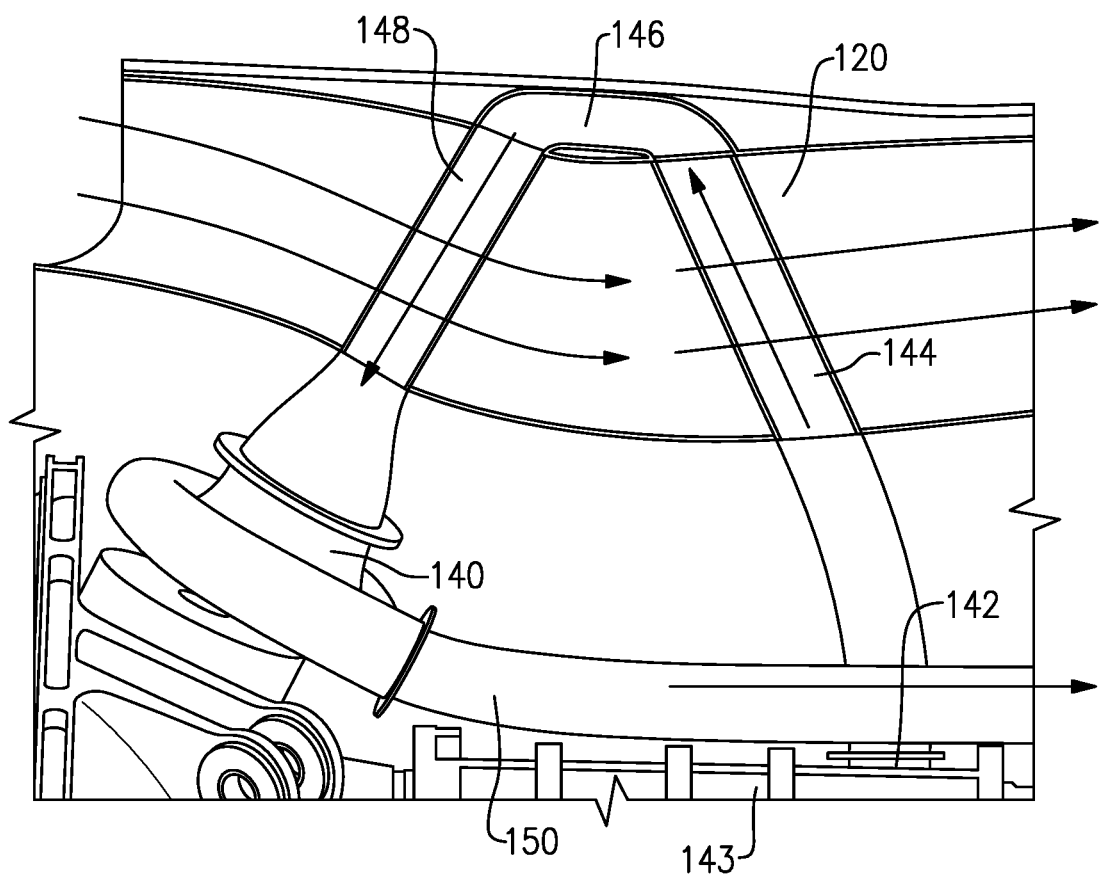
FIG. 5 shows a second embodiment heat exchanger.

FIG. 5 shows another embodiment wherein the cooling compressor 140 receives relatively hot air from an intermediate location 142 in the high pressure compressor 143. The air passes through a first pass 144, an elbow 146, and then a second pass 148 before reaching the compressor 140.

Elbow 146 could be a large plenum or header. Again, FIG. 5 is a schematic representation of the flow path of at least one passage within the heat exchanger and as before the heat transfer inside the passages 144 and 148 is greatly facilitated by the high density inside the passage. Extended surfaces at the outside of 144 and 148 might be incorporated to aid the poorer heat transfer conditions into the relatively low density and poor heat transfer conditions of the bypass air. The air is then delivered into a conduit 150 and passes to the at least the high pressure turbine, but may also be utilized to cool the back sections of the high pressure compressor.

With this second embodiment, the cooling will be more effective, although the air conduits may be somewhat longer.

In both embodiments, the first pass is radially outward and the second pass is radially inward. As is clear from the drawings, the flow need not be directly radially outward and inward. Rather, both passes could be said to extend in a direction with a radial component. Further, the passages in FIGS. 4 and 5 numbered 128 and 132, and 148 and 144 do not have to be in the same plane but can be circumferentially shifted slightly so the heated bypass air coming off of 148 does not greatly affect the temperature available to cool at 144.

Figure 6:
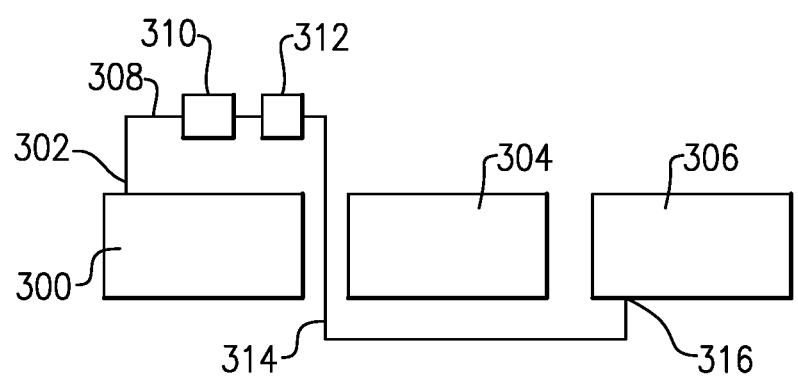
FIG. 6 schematically shows a cooling air flowpath.

FIG. 6 shows a disclosed flowpath for the cooling air. The compressor section 300 has a tap inlet 302 leading into a cooling air flow line 308. The heat exchanger 310 receives that air and cools the air, as in the above embodiments. The air then passes to a cooling compressor 312, and into a direction with a radially inward component, and upstream of a combustor section 304. The airflow at 314 may pass through a hollow vane in a diffuser case surrounding the combustor downstream of the compressor section 300. On its way from the cooling compressor 312 to the internal disks and flow passages of the turbine the air passes by the rear sections of the high pressure compressor which may be cooled with a portion of the air. The air then passes to a turbine disks and blades represented at 306, and exits at an inlet 316 to the turbine's inner rotating and static structures.

In an embodiment, an overall pressure ratio provided by the cooling compressor of FIG. 6 is between 1.1 and 6.0 from the inlet of the cooling compressor 312 to its outlet.

The overall pressure ratio is defined as the total pressure at the inlet divided by the total pressure at the outlet.

In one embodiment, a gas turbine engine has a main compressor. A tap, which taps the flow in the main compressor, is fluidly connected downstream of the main compressor. A heat exchanger is fluidly connected downstream of the tap. An auxiliary, or cooling, compressor unit is fluidly connected downstream of the heat exchanger. The auxiliary compressor unit is configured to compress air cooled by the heat exchanger. An overall auxiliary compressor unit pressure ratio is between 1.1 and 6.0. Specific values from the ranges of the overall auxiliary compressor unit pressure ratios that are within the scope of this invention are dictated by optimal sizing of the heat exchanger and optimal compressor operating parameters (e.g., rotational speed, exit blade heights, etc.), along with consideration of the various combinations of temperatures and pressures at the tap and at the cooling compressor outlet.

As an example, should the tap be selected to be at a low pressure location, say the back of a low pressure compressor, the pressure ratio across the auxiliary compressor may be between 4.1 and 6.0. In one such representative example, an overall auxiliary compressor unit pressure ratio of 6.0 may be used with a bleed inlet temperature of about 250 degrees F., a bleed inlet pressure of about 100 psi, and an optimally sized heat exchanger to arrive at a final pressure on the order of 600 psi. In another representative example, an overall auxiliary compressor unit pressure ratio of 4.1 may be used with a bleed inlet temperature of about 400 degrees F., a bleed inlet pressure of about 150 psi, and an optimally sized heat exchanger to arrive at a final pressure on the order of 600 psi.

On the other hand, should the tap be located further downstream, such as after the first variable vane row in the high pressure compressor, the pressure ratio can be lower, and more on the order of 1.14.0. That is, if the tap is taken downstream of the low pressure compressor, these pressure ratios might be utilized. In one such representative example, an overall auxiliary compressor unit pressure ratio of 4.0 may be used with a bleed inlet temperature of about 400 degrees F., a bleed inlet pressure of about 200 psi, and an optimally sized heat exchanger to arrive at a final pressure on the order of 800 psi. In another representative example, an overall auxiliary compressor unit pressure ratio of 1.1 may be used with a bleed inlet temperature of about 800 degrees F., a bleed inlet pressure of about 550 psi, and an optimally sized heat exchanger to arrive at a final pressure on the order of 600 psi.

One preferred embodiment using a conventionally sized heat exchanger and cooling compressor will have an overall auxiliary compressor unit pressure ratio of about 2.0. Another preferred embodiment having an overall auxiliary compressor unit pressure ratio of about 2.0 may be used with a bleed inlet temperature of about 600 degrees F., a bleed inlet pressure of about 300 psi, arriving at a final pressure on the order of 600 psi.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising;
   a main compressor including a low pressure compressor and a high pressure compressor, said high pressure compressor having a downstream most location and a turbine section having a low pressure turbine driving said low pressure compressor and a high pressure turbine driving said high pressure compressor;
   a fluid tap connected to a more upstream portion of said main compressor than said downstream most location in said high pressure compressor;
   a heat exchanger fluidly connected downstream of said tap;
   an auxiliary compressor unit fluidly connected downstream of said heat exchanger, wherein said auxiliary compressor unit is configured to compress air cooled by said heat exchanger with an overall auxiliary compressor unit pressure ratio between 1.1 and 6.0;
   said tap being in said low pressure compressor, and said overall auxiliary compressor unit pressure ratio being between greater than or equal to 4.1 and less than or equal to 6.0 or said tap being downstream of said low pressure compressor, and said pressure ratio of said auxiliary compressor unit being greater than or equal to 1.1 and less than or equal to 4.0; and
   an air downstream of said auxiliary compressor unit being provided to said high pressure turbine for cooling.

2. The gas turbine engine as set forth in claim 1, wherein said pressure ratio across said auxiliary compressor unit is greater than or equal to 4.1 and less than or equal to 6.0.

3. The gas turbine engine as set forth in claim 2, wherein said tap is in said low pressure compressor.

4. The gas turbine engine as set forth in claim 3, wherein said at least one of said more upstream locations is in a downstream half of said low pressure compressor.

5. The gas turbine engine as set forth in claim 1, wherein said pressure ratio across said auxiliary compressor unit being greater than or equal to 1.1 and less than or equal to 4.0.

6. The gas turbine engine as set forth in claim 1, wherein a main fan delivers bypass air into a bypass duct and into said main compressor section and said heat exchanger positioned within said bypass duct to be cooled by bypass air.

7. The gas turbine engine as set forth in claim 1, wherein said heat exchanger having at least two passes, with a first of said passes passing air in a direction having a radially outward component, and a second of said passes returning the air in a direction having a radially inward component, and said first pass being located downstream of said second pass, and within a bypass duct.

* * * * *